(12) United States Patent
White et al.

(10) Patent No.: US 9,555,711 B2
(45) Date of Patent: Jan. 31, 2017

(54) POWER CONVERTERS

(71) Applicant: Hamilton Sundstrand Corporation, Charlotte, NC (US)

(72) Inventors: Adam M. White, Belvidere, IL (US); Mustansir Kheraluwala, Lake Zurich, IL (US); Richard A. Himmelmann, Beloit, WI (US)

(73) Assignee: Hamilton Sundstrand Corporation, Charlotte, NC (US)

(*) Notice: Subject to any disclaimer, the term of this patent is extended or adjusted under 35 U.S.C. 154(b) by 73 days.

(21) Appl. No.: 14/295,266

(22) Filed: Jun. 3, 2014

(65) Prior Publication Data

US 2015/0343911 A1 Dec. 3, 2015

(51) Int. Cl.
| | |
|---|---|
| *H02P 9/00* | (2006.01) |
| *B60L 11/12* | (2006.01) |
| *H02M 7/5387* | (2007.01) |
| *H02P 6/14* | (2016.01) |
| *H02M 7/493* | (2007.01) |
| *B60L 11/08* | (2006.01) |
| *H02M 7/487* | (2007.01) |

(52) U.S. Cl.
CPC ............ *B60L 11/12* (2013.01); *B60L 11/08* (2013.01); *H02M 7/487* (2013.01); *H02M 7/493* (2013.01); *H02M 7/5387* (2013.01); *H02P 6/14* (2013.01)

(58) Field of Classification Search
USPC ........ 322/16, 18, 19, 21, 22, 23, 25, 27, 29, 322/30, 31, 33, 34, 35, 37, 38, 40, 43; 290/16; 363/363, 37
See application file for complete search history.

(56) References Cited

U.S. PATENT DOCUMENTS

| | | | | |
|---|---|---|---|---|
| 6,751,105 | B2* | 6/2004 | Yamanaka et al. | ............. 363/41 |
| 2005/0226018 | A1* | 10/2005 | Chen et al. | ................... 363/132 |
| 2006/0221653 | A1* | 10/2006 | Lai | ......... H05M 5/225 363/37 |
| 2008/0197816 | A1* | 8/2008 | Monier | ................ H02P 25/085 322/89 |
| 2010/0302819 | A1* | 12/2010 | O'Brien | .................... G05F 1/67 363/95 |
| 2011/0141786 | A1* | 6/2011 | Shen | ..................... H02M 7/487 363/131 |
| 2012/0127769 | A1* | 5/2012 | Kern | ............................ 363/132 |

(Continued)

FOREIGN PATENT DOCUMENTS

| | | |
|---|---|---|
| DE | 102011084698 A1 | 4/2013 |
| JP | 2014033609 A | 2/2014 |
| WO | WO-2013057653 A2 | 4/2013 |

OTHER PUBLICATIONS

Extended European Search Report for European Patent Application No. 15169129.2, dated Mar. 23, 2016.

*Primary Examiner* — Julio Gonzalez Ramirez
(74) *Attorney, Agent, or Firm* — Locke Lord LLP; Scott D. Wofsy; Joshua L. Jones

(57) ABSTRACT

A power converter includes a first set of transistors electrically connected in series, a second set of transistors electrically connected in series, and an AC link. The second set of transistors is electrically connected in parallel with the first set of transistors to form an H-bridge. The AC link is electrically connected between the first and second sets of transistors. A plurality of H-bridges are connected in parallel and a three-wire DC bus is electrically connected to the H-bridges.

10 Claims, 3 Drawing Sheets

(56) References Cited

U.S. PATENT DOCUMENTS

| | | | | |
|---|---|---|---|---|
| 2012/0218795 | A1* | 8/2012 | Mihalache | H02M 7/487 363/97 |
| 2013/0016549 | A1* | 1/2013 | Kieferndorf | H02M 7/487 363/131 |
| 2013/0155747 | A1* | 6/2013 | Wang | 363/132 |
| 2014/0369088 | A1* | 12/2014 | Yoo | H02M 5/458 363/37 |

* cited by examiner

POWER CONVERTERS

BACKGROUND OF THE INVENTION

1. Field of the Invention

The subject invention relates to power converters and more particularly, to active rectifiers and inverters for high voltage power converters, for example, power converters used in aircraft energy generation and propulsion.

2. Description of Related Art

Traditional active rectifiers and inverters are used to convert AC to DC power and DC to AC power, respectively. Development of 'more electric' aircraft architectures has seen the implementation of increasingly sophisticated electrical power and distribution systems. These aircraft architectures more typically include electrical systems with higher power densities and higher voltages than in traditional architectures. Power conversion for a hybrid-electric or all electric vehicle, such as an aircraft, can potentially require power converters to handle megawatts of electrical power.

While traditional active rectifiers and inverters are satisfactory for their intended purpose, continued developments toward the "more electric" vehicle have led to a need for improved power converters that are capable of handling higher currents and voltages. The present invention provides a solution for these problems.

SUMMARY OF THE INVENTION

A power converter includes a first set of transistors electrically connected in series, a second set of transistors electrically connected in series, and an AC link. The second set of transistors is electrically connected in parallel with the first set of transistors to form an H-bridge. The AC link is electrically connected between the first and second sets of transistors.

The power converter can include a three-wire DC bus electrically connected in parallel to the H-bridge. A first DC source of one-half the total DC voltage can be electrically connected between a first and a second DC wire. A second DC source of one-half the total DC voltage can be electrically connected between a second and a third DC wire. The first and second sets of transistors each form respective 3-level phase legs. The DC bus can be configured to be electrically connected to 1600 Vdc or more. The AC link can be electrically connected to an isolated AC machine phase winding, for example.

The first and second sets of transistors can each include an even number of transistors, such as four transistors. First and second middle transistors of the four transistors in each set of transistors can be connected in parallel with a respective pair of diodes, wherein each pair of diodes are connected in series for limiting the voltage input to at least one of the transistors in each set of transistors. The AC link can be electrically connected to each set of transistors between the first and second middle transistors in each set of transistors, where the sets of transistors each include four transistors. The AC link includes at least one terminal. The AC link can include two respective terminals, for example, one electrically coupled to the first set of transistors and the second electrically coupled to the second set of transistors. Each terminal of the AC link can electrically connect the H-bridge to an isolated AC machine phase winding. Each terminal is configured so that an AC link voltage at the terminal is at least one of +Vdc/2 volts, 0 volts, and/or −Vdc/2 volts. The transistors can include at least one of 1200V and/or 1700V MOSFET devices, for example.

In accordance with another embodiment, the power converter includes a plurality of H-bridges connected in parallel and a DC bus electrically connected in parallel to the H-bridges. Each H-bridge includes a respective first and second set of transistors electrically connected in series, and a respective AC link, as described above. The AC link of each respective H-bridge includes at least one terminal, as described above. For example, the plurality of H-bridges can include six H-bridges.

A hybrid-electric propulsion system includes a generator, an active rectifier, a battery, a motor drive, and a motor. The active rectifier is electrically connected to respective isolated AC phase windings of the generator for converting alternating current energy to direct current energy. The battery is electrically connected to an output of the active rectifier for storing the direct current energy supplied through the active rectifier. The motor drive is electrically connected to the output of the active rectifier and the battery for converting at least one of the direct current energy generated by the active rectifier and/or the direct current energy stored by the battery into alternating current energy. The motor is electrically connected to an output of the motor drive through isolated AC phase windings. The active rectifier and the motor drive each include a respective three-wire DC bus electrically connected to a respective power converter as described above. The hybrid-electric propulsion system can also include at least one of a battery charger and/or a battery discharger electrically connected between the active rectifier and the battery for controlling the current flow to or from the battery.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art will readily understand how to make and use the methods and devices disclosed herein without undue experimentation, the methods and devices will be described in detail herein below with reference to certain figures, wherein.

DETAILED DESCRIPTION OF THE PREFERRED EMBODIMENTS

Figure 1:
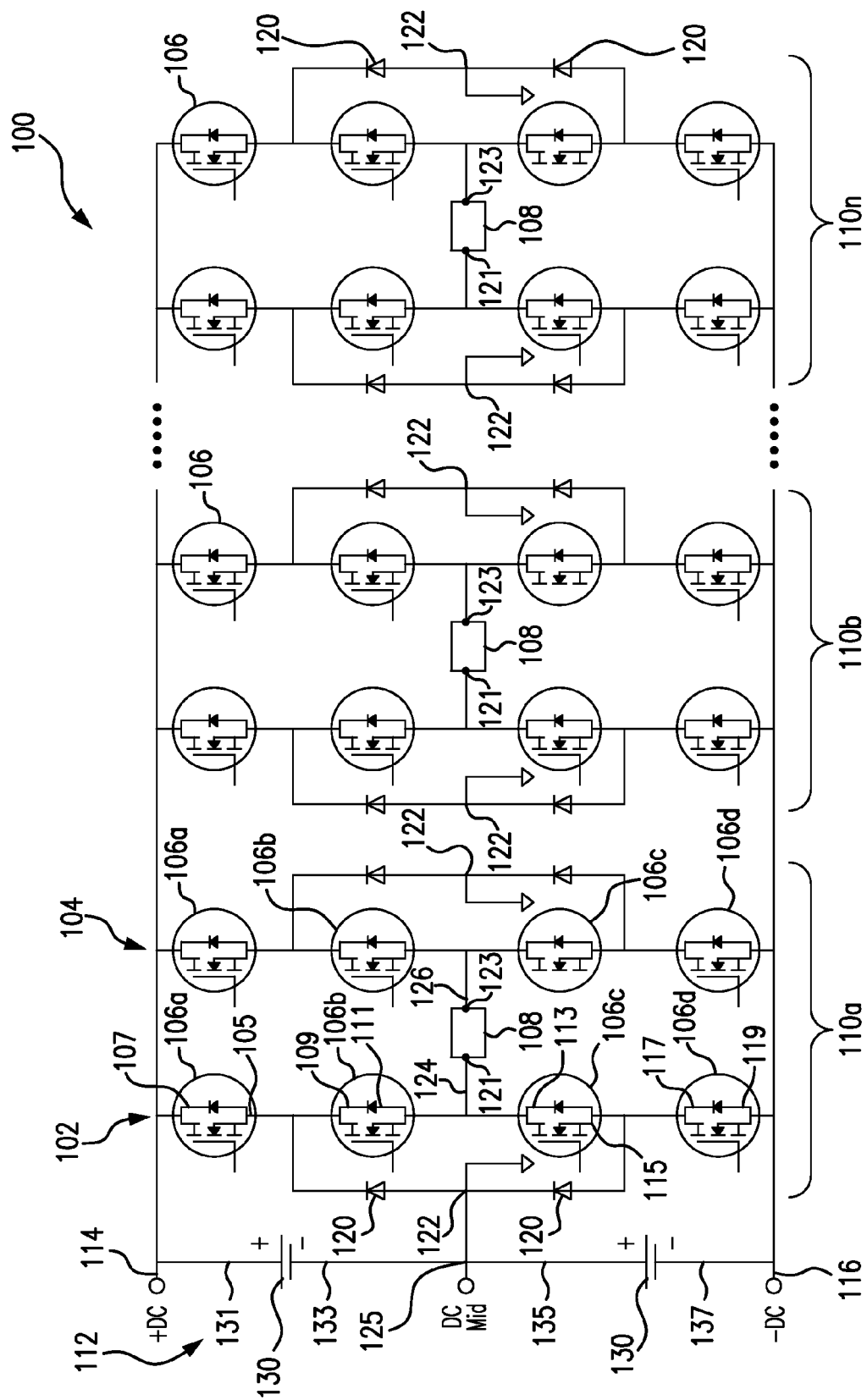
FIG. 1 is schematic diagram of an exemplary embodiment of a power converter constructed in accordance with the present disclosure, showing a plurality of H-bridges and isolated electric machine AC phase windings.

Reference will now be made to the drawings wherein like reference numerals identify similar structural features or aspects of the subject disclosure. For purposes of explanation and illustration, and not limitation, a schematic diagram of an exemplary embodiment of the power converter in accordance with the disclosure is shown in FIG. 1 and is designated generally by reference character 100. Other embodiments of power converters in accordance with the disclosure, or aspects thereof, are provided in FIGS. 2-3, as will be described.

As shown in FIG. 1, a power converter 100 includes a plurality of phases, e.g. H-bridges 110a, 110b and 110n. Each phase 110 includes a respective first set 102 of four transistors 106a-106d electrically connected in series, forming a three-level phase leg, a respective second set 104 of four transistors 106a-106d electrically connected in series, forming a second three-level phase leg, and a respective AC link 108. Each second set 104 of transistors 106a-106d is electrically connected in parallel with a respective first set 102 of transistors 106a-106d to form H-bridges 110. Respective AC links 108 are electrically connected between each first and second set of transistors, 102 and 104, respectively. With continued reference to FIG. 1, a first transistor 106a of a respective set, first and/or second sets 102 and 104, respectively, includes a source 105 and a drain 107. Drain 107 is connected to a positive DC lead 114, further described below. Source 105 is connected to a drain 109 of a second transistor 106b of the same set. Second transistor 106b includes a source 111 connected to a drain 113 of third transistor 106c of the same set. Third transistor 106c includes a source 115 connected to a drain 117 of a fourth transistor 106d of the same set. Fourth transistor 106d includes a source 119 connected to a negative DC lead 116, described below.

Second transistor 106b and third transistor 106c, e.g. the middle transistors, of a respective set, first and/or second sets 102 and 104, respectively, are connected in parallel with a pair of diodes 120. Diodes 120 in each respective pair are connected in series with one another for limiting the voltage input to transistors 106a, 106b, 106c and 106d. Each AC link 108 is electrically connected to its respective H-bridge 110 between first set 102 and second set 104 of transistors 106. Each AC link 108 has two terminals 121 and 123. A lead 124 of terminal 121 connects between second and third transistors, 106b and 106c, respectively, of first set 102 and a lead 126 of terminal 123 connects between second and third transistors, 106b and 106c, respectively, of second set 104. Each AC link 108 is electrically connected to a respective isolated AC machine phase winding 218, as described below with respect to FIG. 2. Those skilled in the art will readily appreciate that while there are three phases 110a, 110b and 110n shown, any number of suitable phases 110 can be used depending on the desired current flow through each phase 110. For example, there can be six phases 110 where each phase 110 is electrically connected to a respective AC machine phase winding 218, as described below with respect to FIG. 2.

Those skilled in the art will readily appreciate that converting power to or received from isolated AC phase windings 218 results in five level waveforms seen by each phase winding 218. The voltage at each of terminals 121 and 123 of each AC link 108, can be at least one of 3-levels: +Vdc/2 volts, 0 volts, or −Vdc/2 volts. The AC link voltage of each respective H-bridge 110 is the differential voltage at the respective AC link terminals 121 and 123 of respective phase legs 102 and 104, such that the voltage of H-bridge 110 is at least one of 5-levels: +Vdc volts, +Vdc/2 volts, 0, −Vdc/2 volts, and/or −Vdc volts.

For example, for a DC link voltage (from +DC to −DC) of 2000V, the AC link voltage of respective H-bridge 110 is configured to provide at least one of +2000 volts, +1000 volts, 0, −1000 volts, and/or −2000 volts, e.g. 5-levels. The instantaneous output voltage ($V_{out}$) level for a particular H-bridge 110 depends on the open and/or closed configuration of transistors 106a-106d in their respective phase legs 102 and 104. An example of this is shown below in Table 1. Transistors 106a and 106c of a respective phase leg 102 or 104 are complementary, e.g. when transistor 106a is on, transistor 106c is off. Transistors 106b and 106d of a respective phase leg 102 or 104 are also complementary. Double dashes "--" indicate that a state is forbidden or not used. The instantaneous value of voltage is switched between these 5 levels in order to provide the desired time-average of voltage to the AC link via pulse-width modulation (PWM).

| | Phase Leg | | | | $V_{out}$ |
|---|---|---|---|---|---|
| | 102 | | 104 | | |
| Transistor | 106a and 106c | 106b and 106d | 106a and 106c | 106b and 106d | |
| | ON/OFF | ON/OFF | ON/OFF | ON/OFF | 0 |
| | ON/OFF | ON/OFF | ON/OFF | OFF/ON | -- |
| | ON/OFF | ON/OFF | OFF/ON | ON/OFF | +Vdc/2 |
| | ON/OFF | ON/OFF | OFF/ON | OFF/ON | +Vdc |
| | ON/OFF | OFF/ON | ON/OFF | ON/OFF | -- |
| | ON/OFF | OFF/ON | ON/OFF | OFF/ON | -- |
| | ON/OFF | OFF/ON | OFF/ON | ON/OFF | -- |
| | ON/OFF | OFF/ON | OFF/ON | OFF/ON | -- |
| | OFF/ON | ON/OFF | ON/OFF | ON/OFF | −Vdc/2 |
| | OFF/ON | ON/OFF | ON/OFF | OFF/ON | -- |
| | OFF/ON | ON/OFF | OFF/ON | ON/OFF | 0 |
| | OFF/ON | ON/OFF | OFF/ON | OFF/ON | +Vdc/2 |
| | OFF/ON | OFF/ON | ON/OFF | ON/OFF | −Vdc |
| | OFF/ON | OFF/ON | ON/OFF | OFF/ON | -- |
| | OFF/ON | OFF/ON | OFF/ON | ON/OFF | −Vdc/2 |
| | OFF/ON | OFF/ON | OFF/ON | OFF/ON | 0 |

Transistors 106 include metal oxide semiconductor field effect transistor (MOSFET) devices, for example 1200V and/or 1700V SiC (Silicon Carbide) MOSFET devices. Those skilled in the art will readily appreciate that one or more of transistors 106 can optionally be silicon insulated gate bipolar transistors (IGBTs). 1200V and 1700V devices tend to have more efficient switching characteristics than higher voltage rated devices, but it is contemplated that a variety of suitable voltages can be used for the MOSFET and/or IGBT devices. Further, those skilled in the art will readily appreciate that any suitable switching devices can be used at any suitable voltages. In addition, those skilled in the art will readily appreciate that while any suitable switching devices can be used, SiC MOSFET devices generally enable very high switching frequencies, high power converter efficiency, and lower filter weight.

Power converter 100 includes a three-wire DC bus 112 electrically connected in parallel to H-bridges 110. DC bus 112 includes a power source/output 130 between a positive DC terminal 114 and a negative DC terminal 116. A first DC source 130 of one-half the total DC voltage is electrically connected between first and second DC wires, 131 and 133, respectively. A second DC source 130 of one-half the total DC voltage is electrically connected between second and third DC wires, 135 and 137, respectively. DC bus 112 includes a common terminal 125, e.g. DC midpoint terminal, connected to respective common terminals 122 of each H-Bridge 110. First and second sets of transistors, 104 and 106, respectively, each include a respective common terminal 122 between a respective pair of diodes 120. The DC link voltage may, for example, be 2000V total partitioned into +1000V between terminals 114 and 125, and +1000V between terminals 125 and 116. Common terminal 125 may be grounded, such that terminal 114 is at a voltage potential of +1000V relative to ground, and terminal 116 is at a voltage potential of −1000V relative to ground. Those skilled in the art will readily appreciate that common terminal 125 can optionally be floating or a fixed impedance relative to ground without precluding the functionality of power converter 100.

Additionally, those skilled in the art will readily appreciate that using three-level phase legs enables DC bus voltages of up to 1600V or higher with 1200V MOSFET devices, or 2300V or higher with 1700V MOSFET devices while maintaining margin for voltage transients and unbalances. High DC bus voltages, e.g. 2000V, are beneficial for power levels of several megawatts, such as those power levels needed for aircraft electrical propulsion. Using three-level phase legs to create a five-level phase voltage waveform requires less filtering of the waveshape due to lower current and voltage distortion as compared with a lower level waveform, enabling lower filter weight. Those skilled in the art will readily appreciate that while DC voltages of 1600V or higher are described herein, the DC bus can be configured to be electrically connected to a variety of suitable DC voltages, for example DC voltages of less than 1600V.

Those skilled in the art will readily appreciate that by using 1700V SiC MOSFET devices, the DC link voltage may be 2000 Vdc while still maintaining 41% margin for overshoots, transients and voltage imbalance before device breakdown voltages are exceeded. Through the use of the 5-level H-bridge arrangement, e.g. H-bridge 110, and Silicon Carbide transistors, e.g. transistors 106, switching losses tend to be less than those of an alternate arrangement of high voltage silicon IGBTs. For example a 3300V, 200A IGBT in a conventional H-bridge arrangement may create 400 mJ of loss per switching event at a 2000V link voltage, whereas a 1700V, 200A SiC MOSFET in a multi-level H-bridge arrangement may create only 151 mJ of loss per switching event at a 2000V link with only a 1000V device voltage. The reduced switching losses tend to enable faster switching frequencies and smaller filtering inductors and capacitors, thereby increasing both efficiency and power density of the power converter. Additionally, the higher DC link voltage, for example 2000 Vdc, enables lower currents than would be required for supplying a given quantity of power at a conventional lower aerospace DC link voltage, for example 270 Vdc.

Figure 2:
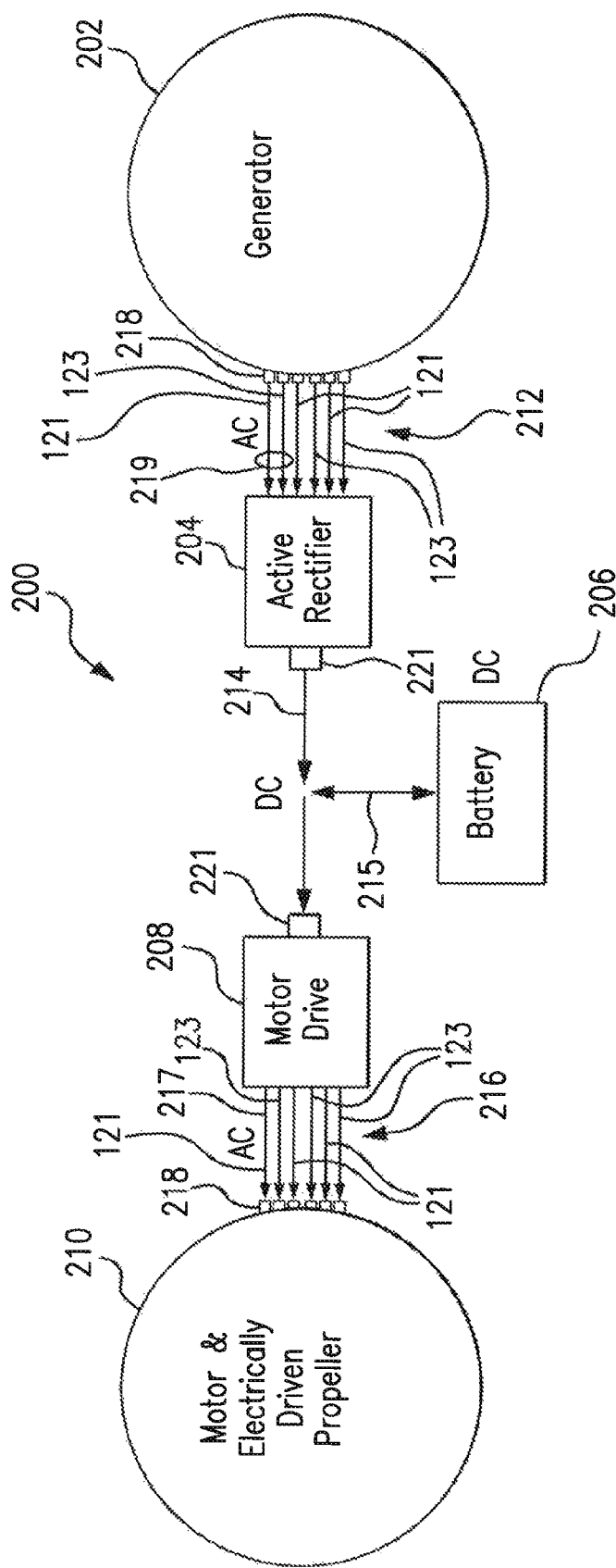
FIG. 2 is a schematic diagram of an exemplary embodiment of a hybrid-electric propulsion system constructed in accordance with the present disclosure, showing a motor drive, an active rectifier, and a battery.

Now with reference to FIG. 2, a hybrid-electric propulsion system 200 includes a generator 202, an active rectifier 204, a battery 206, a motor drive 208, and a motor 210. AC links, e.g. AC links 108 described above, of active rectifier 204 are electrically connected to an AC output 212 of generator 202 through respective isolated AC phase windings 218 of generator 202, for converting alternating current energy to direct current energy. Battery 206 is electrically connected to a DC output 214 of active rectifier 204 for storing the direct current energy supplied through active rectifier 204. Motor drive 208 is electrically connected to a DC output 214 of active rectifier 204 and/or a DC output 215 of battery 206 for converting the direct current energy generated by active rectifier 204 and/or battery 206 into alternating current energy. Motor 210 includes isolated AC phase windings 218. Isolated AC phase windings 218 of motor 210 are electrically connected to an AC output 216 of motor drive 208 by way of respective AC links 108, as described above, of motor drive 208. Active rectifier 204 and motor drive 208 each include a respective DC bus 221 electrically connected to a respective set of phases 110, as described above with respect to FIG. 1. Those skilled in the art will readily appreciate that while the power is shown schematically with arrows in FIGS. 2 and 3 going from generator 202 to motor 210, motor drive 208 and active rectifier 204 can be bi-directional, e.g. power can flow from generator 202 to motor 210 or from motor 210 to generator 202.

Respective power converter 100 within active rectifier 204 acts to convert alternating current energy, e.g. alternating current energy supplied through generator output 212, received from respective isolated AC phase windings 218 into direct current energy. Isolated AC phase windings 218 of generator 202 correspond to respective phases 219 of generator 202. The direct current energy is output through DC bus 112 to active rectifier output 214. The direct current energy output can either be stored in battery 206 or converted to alternating current energy by motor drive 208 for use in motor 210. While generator 202 is shown with six-phases 219 to correspond its respective isolated AC phase windings 218, those skilled in the art will readily appreciate that generator 202 can have any number suitable phases as needed to connect to a respective power converter 100.

Respective power converter 100 within motor drive 208, e.g. an inverter, acts to convert direct current energy, e.g. direct current energy supplied through battery 206 or active rectifier output 214, received through DC bus 112 into alternating current energy. The alternating current energy is output to respective isolated AC phase windings 218 of the motor 210 from motor drive output 216. Isolated AC phase windings 218 of motor drive 208 correspond to its respective phases 217. The alternating current energy output through motor drive output 216 is used to drive motor 210. Those skilled in the art will readily appreciate that the isolated AC machine phase windings 218 when combined with the H-bridge configuration of power converter 100 of motor drive 208 allow a positive and negative peak AC phase winding voltage equal to the full voltage amplitude of DC link 214. This provides a $\sqrt{3}$ higher motor winding voltage than would be achievable with a half bridge motor drive connection when powering a star-connected set of three-phase AC machine windings. For example, the three-phase half bridge star-connected configuration tends to only allow the application of the full voltage amplitude of DC link 214 across the line to line connection of the motor windings. While motor 210 is shown with six-phases 217 to correspond to its respective isolated AC phase windings 218, those skilled in the art will readily appreciate that motor 210 can have any number suitable phases as needed to connect to a respective power converter.

Figure 3:
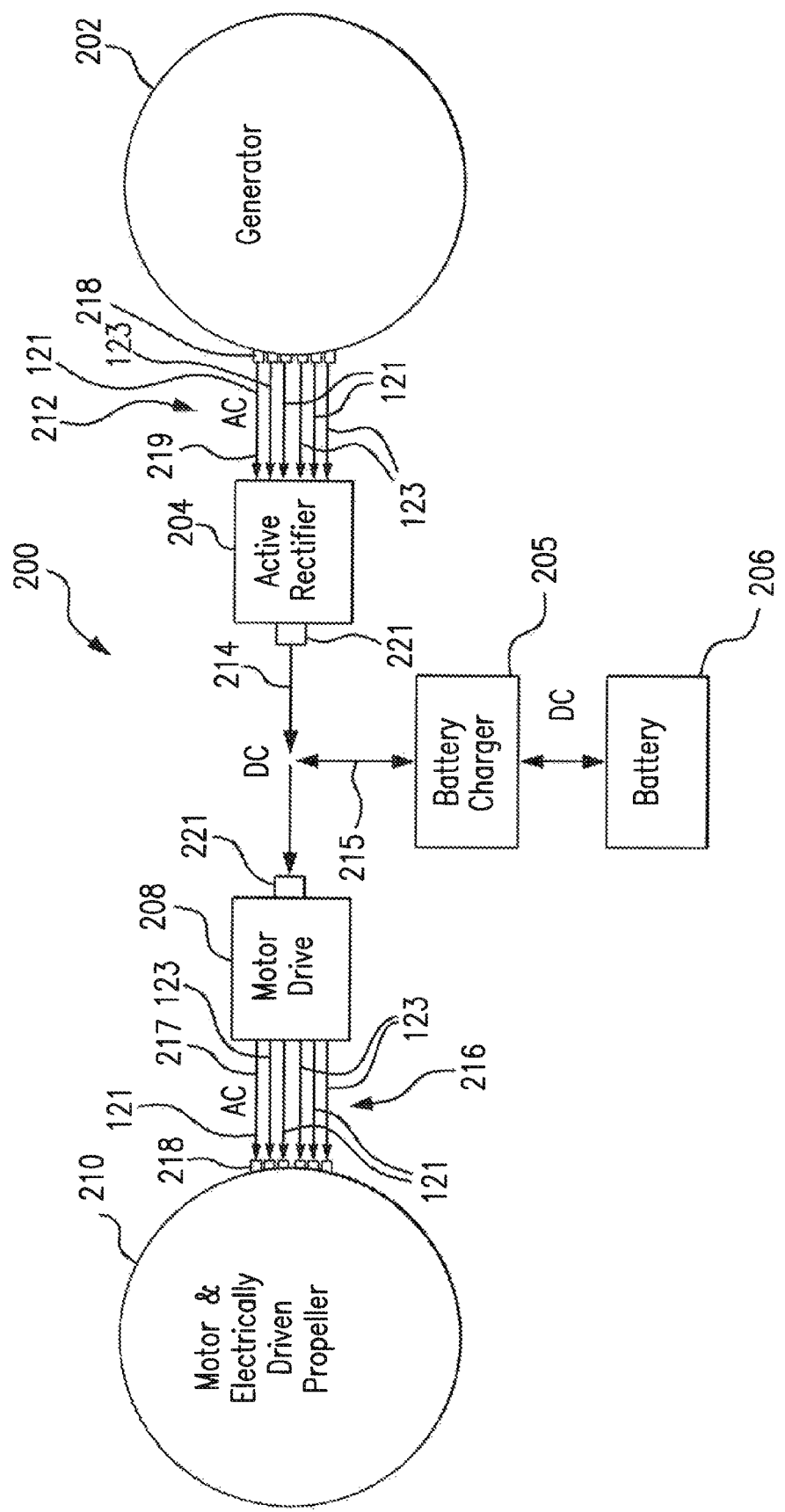
FIG. 3 is a schematic diagram of the hybrid-electric propulsion system of FIG. 2, showing a battery charger and/or discharger electrically connected between the active rectifier and the battery.

As shown in FIG. 3, hybrid-electric propulsion system 200 optionally includes a battery charger 205 electrically connected between the active rectifier 204 and battery 206 for controlling the current flow to or from battery 206. It is contemplated that the battery charger may be required for certain battery chemistries and for explicit control of the battery current, however including the charger may also increase cost and weight of system 200.

The methods and systems of the present invention, as described above and shown in the accompanying drawings, provide for a power converter and aerospace hybrid electric propulsion system with superior properties including low weight, high power and high voltage capabilities. While the apparatus and methods of the subject invention have been shown and described with reference to preferred embodiments, those skilled in the art will readily appreciate that changes and/or modification may be made thereto without departing from the spirit and scope of the subject invention.

What is claimed is:

1. A power converter comprising:
a first set of transistors electrically connected in series;
a second set of transistors electrically connected in series, wherein the second set of transistors is electrically connected in parallel with the first set of transistors to form an H-bridge;
a three-wire DC bus electrically connected in parallel to the H-bridge;
a bi-directional AC link electrically connected between the first and second sets of transistors; and
a DC bus electrically connected to a battery and a DC bus of a second power converter, the second power converter being electrically connected to a generator,
wherein the first and second sets of transistors each form respective 3-level phase legs and the first and second sets of transistors are operated to output a five-level phase voltage waveform from the AC link, and
wherein at least one terminal of the AC link electrically connects the H-bridge to an isolated AC machine phase winding.

2. A power converter as recited in claim 1, wherein the DC bus is configured to be electrically connected to 1600 Vdc or more.

3. A power converter as recited in claim 1, wherein the first and second sets of transistors each include four transistors.

4. A power converter as recited in claim 3, wherein first and second middle transistors of the four transistors in each set of transistors are connected in parallel with a respective pair of diodes, wherein each pair of diodes are connected in series for limiting the voltage input to at least one of the transistors in each set of transistors.

5. A power converter as recited in claim 1, wherein the AC link of the H-bridge includes at least one terminal, wherein the terminal is configured so that an AC link voltage at the terminal is at least one of +Vdc/2 volts, 0 volts, and/or −Vdc/2 volts.

6. A power converter as recited in claim 1, wherein the transistors include at least one of 1200V and/or 1700V MOSFET devices.

7. A power converter as recited in claim 1, wherein the power converter is included in a hybrid-electric propulsion system that includes:
the generator;
an active rectifier electrically connected to respective isolated AC phase windings of the generator for converting alternating current energy to direct current energy;
the battery electrically connected to an output of the active rectifier for storing the direct current energy supplied through the active rectifier;
a motor drive electrically connected to the output of the active rectifier and the battery for converting at least one of the direct current energy generated by the active rectifier and/or the direct current energy stored by the battery into alternating current energy; and
a motor electrically connected to an output of the motor drive through the isolated AC phase windings, wherein the active rectifier and the motor drive each include a respective three-wire DC bus electrically connected to the power converter and the second power converter.

8. A power converter as recited in claim 7, further comprising at least one of a battery charger and/or battery discharger electrically connected between the active rectifier and the batter for controlling current flow to or from the battery.

9. A power converter as recited in claim 1, wherein when the AC link operates in a first direction, the power converter receives direct current from at least one of the battery and the generator, and alternating current energy is supplied via the AC link to a motor via the AC machine phase winding.

10. A power converter as recited in claim 9, wherein when the AC link operates in a second direction, alternating current is supplied from the motor via the AC machine phase winding to the H-bridge and direct current is supplied to at least one of the battery and the generator via the second power converter.

* * * * *